(12) United States Patent
Mueller et al.

(10) Patent No.: US 9,096,697 B2
(45) Date of Patent: Aug. 4, 2015

(54) METHOD FOR PRODUCING AN AQUEOUS BINDING AGENT DISPERSION

(75) Inventors: Kevin Mueller, Heppenheim (DE); Kathrin Michl, Ludwigshafen (DE); Christian Brand, Hettenleidelheim (DE); Kai Olfermann, Kaiserslautern (DE)

(73) Assignee: BASF SE, Ludwigshafen (DE)

( * ) Notice: Subject to any disclaimer, the term of this patent is extended or adjusted under 35 U.S.C. 154(b) by 682 days.

(21) Appl. No.: 13/391,941

(22) PCT Filed: Sep. 7, 2010

(86) PCT No.: PCT/EP2010/063086
§ 371 (c)(1),
(2), (4) Date: Feb. 23, 2012

(87) PCT Pub. No.: WO2011/029810
PCT Pub. Date: Mar. 17, 2011

(65) Prior Publication Data
US 2012/0156467 A1    Jun. 21, 2012

(30) Foreign Application Priority Data
Sep. 9, 2009   (EP) .................................... 09169849

(51) Int. Cl.
*C08F 20/18* (2006.01)
*C08F 12/00* (2006.01)
*C08L 33/06* (2006.01)
*C08L 33/26* (2006.01)
*C08L 25/00* (2006.01)

(52) U.S. Cl.
CPC ................ *C08F 12/00* (2013.01); *C08L 25/00* (2013.01); *C08L 33/066* (2013.01); *C08L 33/068* (2013.01); *C08L 33/26* (2013.01)

(58) Field of Classification Search
CPC ...... C08L 33/068; C08L 33/26; C08L 33/066
USPC ............................................ 526/328, 303, 1
See application file for complete search history.

(56) References Cited

U.S. PATENT DOCUMENTS

| | | | |
|---|---|---|---|
| 2,520,959 A | 9/1950 | Powers | |
| 3,397,165 A | 8/1968 | Goodman et al. | |
| 4,076,917 A | 2/1978 | Swift et al. | |
| 5,143,582 A | 9/1992 | Arkens et al. | |
| 5,427,587 A | 6/1995 | Arkens et al. | |
| 5,661,213 A | 8/1997 | Arkens et al. | |
| 5,718,728 A | 2/1998 | Arkens et al. | |
| 5,763,524 A | 6/1998 | Arkens et al. | |
| 6,241,780 B1 | 6/2001 | Arkens et al. | |
| 6,433,098 B1 * | 8/2002 | Brown et al. | ................ 525/274 |
| 2005/0004309 A1 * | 1/2005 | Gerst et al. | .................... 525/107 |

FOREIGN PATENT DOCUMENTS

| | | |
|---|---|---|
| DE | 2 214 450 | 10/1975 |
| DE | 196 24 299 | 1/1997 |
| DE | 196 21 027 | 11/1997 |
| DE | 197 41 184 | 3/1999 |
| DE | 197 41 187 | 3/1999 |
| DE | 198 05 122 | 4/1999 |
| DE | 198 28 183 | 12/1999 |
| DE | 198 39 199 | 3/2000 |
| DE | 198 40 586 | 3/2000 |
| DE | 198 47 115 | 4/2000 |
| EP | 0 445 578 | 9/1991 |
| EP | 0 583 086 | 2/1994 |
| EP | 0 651 088 | 5/1995 |
| EP | 0 661 305 | 7/1995 |
| EP | 0 672 920 | 9/1995 |
| EP | 0 771 328 | 5/1997 |
| EP | 0 814 096 A1 | 12/1997 |
| EP | 0 882 074 | 12/1998 |
| EP | 0 882 093 | 12/1998 |
| EP | 0 882 094 | 12/1998 |
| EP | 0 902 796 | 3/1999 |
| EP | 0 1005508 | 6/2000 |
| EP | 1 018 523 | 7/2000 |
| EP | 0 1240205 | 9/2002 |
| EP | 0 1340774 | 9/2003 |
| EP | 0 1448733 | 8/2004 |
| EP | 0 1457245 | 9/2004 |
| JP | 59 008747 | 1/1984 |
| JP | 63 264958 | 11/1988 |

OTHER PUBLICATIONS

International Search Report issued on Nov. 30, 2010 in PCT/EP10/63086 filed on Sep. 7, 2010.

* cited by examiner

*Primary Examiner* — Kuo-Liang Peng
(74) *Attorney, Agent, or Firm* — Oblon, McClelland, Maier & Neustadt, L.L.P.

(57) ABSTRACT

Aqueous polymer dispersion as a binder for particulate and/or fibrous substrates.

20 Claims, No Drawings

METHOD FOR PRODUCING AN AQUEOUS BINDING AGENT DISPERSION

The present invention relates to a process for the preparation of an aqueous dispersion of a polymer A by free radical aqueous emulsion polymerization of ethylenically unsaturated monomers in the presence of at least one dispersant and at least one free radical initiator, wherein from 0.1 to 5% by weight of acrylamide and/or methacrylamide (monomer A1),
from 0.1 to 15% by weight of at least one ethylenically unsaturated $C_3$- to $C_6$-mono- or dicarboxylic acid (monomer A2),
from 0.1 to 10% by weight of at least one ethylenically unsaturated compound which has at least one oxiranyl or one oxetanyl group (monomer A3), and
from 70 to 99.7% by weight of at least one other ethylenically unsaturated compound which is copolymerizable with the monomers A1 to A3 (monomer A4), are used for the polymerization, the amounts of monomers A1 to A4 summing to 100% by weight (total amount of monomers).

The present invention furthermore relates to aqueous polymer dispersions which are obtained by the process according to the invention, the use of these aqueous polymer dispersions as binders for particulate and/or fibrous substrates, processes for the production of moldings with the use of the aqueous polymer dispersions according to the invention and the moldings themselves which are obtainable by the process according to the invention.

The bonding of particulate or fibrous substrates, in particular to give sheet-like structures, such as, for example, fiber webs, fiber boards, particle boards or papers, etc., frequently effected by chemical method with the use of a polymeric binder. In order to increase the strength, in particular the wet and heat stability, binders which comprise crosslinking agents eliminating formaldehyde are often used. However, this gives rise to the danger of undesired formaldehyde emission.

In order to avoid formaldehyde emissions, numerous alternatives to the binders known to date have already been proposed. Thus, U.S. Pat. No. 4,076,917 discloses binders which comprise carboxylic acid- or carboxylic anhydride-containing polymers and β-hydroxyalkylamides as crosslinking agents. A disadvantage is the relatively complicated preparation of the β-hydroxyalkylamides.

EP-A-445578 discloses boards comprising finely divided materials, such as, for example, glass fibers, in which mixtures of high molecular weight polycarboxylic acids and polyhydric alcohols, alkanolamines or polyfunctional amines act as binders.

EP-A-583086 discloses formaldehyde-free, aqueous binders for the production of fiber webs, in particular glass fiber webs. The binders comprise a polycarboxylic acid having at least two carboxyl groups and optionally also anhydride groups and a polyol. These binders require a phosphorus-containing reaction accelerator in order to achieve sufficient strengths of the glass fiber webs. It should be pointed out that the presence of such a reaction accelerator can be dispensed with only if a highly reactive polyol is used. β-Hydroxyalkyl-amides are mentioned as highly reactive polyols.

EP-A-651088 describes corresponding binders for substrates comprising cellulose fibers. These binders must comprise a phosphorus-containing reaction accelerator.

EP-A-672920 describes formaldehyde-free binders, impregnating agents or coating materials which comprise a polymer, which is composed of from 2 to 100% by weight of an ethylenically unsaturated acid or an acid anhydride as a comonomer, and at least one polyol. The polyols are substituted triazine, triazinetrione, benzene or cyclohexyl derivatives, the polyol radicals always being present in the 1,3,5-position of the rings mentioned. In spite of a high drying temperature, only low wet breaking strengths are achieved with these binders on glass fiber webs.

DE-A-2214450 describes a copolymer which is composed of from 80 to 99% by weight of ethylene and from 1 to 20% by weight of maleic anhydride. The copolymer, together with a crosslinking agent, is used, in powder form or in dispersion in an aqueous medium, for surface coating. A polyalcohol containing amino groups is used as a crosslinking agent. However, it is necessary to heat up to 300° C. in order to bring about crosslinking.

U.S. Pat. No. 5,143,582 discloses the production of heat-resistant web materials with the use of a thermally curing, heat-resistant binder. The binder is free of formaldehyde and is obtained by mixing a polymer having carboxyl groups, carboxylic anhydride groups or carboxylic acid salt groups and a crosslinking agent. The crosslinking agent is a β-hydroxyalkylamide or a polymer or copolymer thereof. The polymer crosslinkable with the β-hydroxyalkylamide is composed, for example, of unsaturated mono- or dicarboxylic acids, salts of unsaturated mono- or dicarboxylic acids or unsaturated anhydrides. Self-curing polymers are obtained by copolymerization of the β-hydroxyalkylamides with monomers comprising carboxyl groups.

Furthermore, formaldehyde-free aqueous binder systems based on polycarboxylic acids and polyols or polyamines are familiar to the person skilled in the art (cf. for example EP-A 445578, EP-A 661305, EP-A 882074, EP-A 882093, EP-A 882094, EP-A 902796, EP-A 1005508, EP-A 1018523, EP-A 1240205, EP-A 1448733, EP-A 1340774 or EP-A 1457245).

It was an object of the present invention to provide a formaldehyde-free binder system for particulate and/or fibrous substrates, in particular papers, by means of which substrates having an improved bursting strength result in comparison with the binders of the prior art.

Accordingly, the aqueous dispersion of the polymer A (aqueous polymer A dispersion) defined at the outset was found as a binder.

The procedure for free radical emulsion polymerization from ethylenically unsaturated monomers in an aqueous medium has recently been described before and is therefore sufficiently well known to the person skilled in the art [cf. in this context Emulsion Polymerization in Encyclopedia of Polymer Science and Engineering, vol. 8, page 659 et seq. (1987); D. C. Blackley, in High Polymer Latices, vol. 1, page 35 et seq. (1966); H. Warson, The Applications of Synthetic Resin Emulsions, chapter 5, page 246 et seq. (1972); D. Diederich, Chemie in unserer Zeit 24, pages 135 to 142 (1990); Emulsion Polymerisation, Interscience Publishers, New York (1965); DE-A 40 03 422, and Dispersionen synthetischer Hochpolymerer, F. Hölscher, Springer-Verlag, Berlin (1969)]. The free radical aqueous emulsion polymerization reactions usually take place in a manner such that the ethylenically unsaturated monomers are dispersed in an aqueous medium in the form of monomer droplets with a concomitant use of dispersants and are polymerized by means of a free radical polymerization initiator. The present process according to the invention differs from this procedure only through the use of the specific monomers A1 to A4.

Acrylamide and/or methacrylamide are used as monomers A1, methacrylamide being particularly preferred.

The amount of monomers A1 in the process according to the invention is from 0.1 to 5% by weight, preferably from 0.5 to 3% by weight and particularly preferably from 0.7 to 2.5% by weight, based in each case on the total amount of monomers.

Ethylenically unsaturated, in particular α,β-monoethylenically unsaturated, $C_3$- to $C_5$-mono- or dicarboxylic acids are used as monomers A2, α,β-monoethylenically unsaturated $C_3$- and $C_4$-mono- and $C_4$- to $C_6$-dicarboxylic acids being preferred. Acrylic acid, methacrylic acid, ethylacrylic acid, allylacetic acid, crotonic acid, vinylacetic acid, maleic acid, fumaric acid, itaconic acid, methylmaleic acid, methylenemalonic acid, dimethylacrylic acid and/or 1,2,3,6-tetrahydrophthalic acid and the ammonium, sodium or potassium salts of the abovementioned acids may be mentioned by way of example as monomers A2, acrylic acid and/or methacrylic acid being particularly preferred. Of course, according to the invention the anhydrides derived therefrom, such as, for example, maleic anhydride and/or methylmaleic anhydride, are also considered as belonging to the $C_4$- to $C_6$-dicarboxylic acids.

The amount of the monomers A2 in the process according to the invention is from 0.1 to 15% by weight, preferably from 0.5 to 10% by weight and particularly preferably from 1 to 7% by weight, based in each case on the total amount of monomers.

Ethylenically, in particular, α,β-monoethylenically, unsaturated compounds which have at least one oxiranyl or one oxetanyl group are used as monomers A3, those compounds which have an oxiranyl group being preferred. Vinyl-oxirane, allyloxirane, glycidyl acrylate and/or glycidyl methacrylate may be mentioned by way of example as monomers A3 having at least one oxiranyl group and vinyloxetane, allyloxetane, 3-methyloxetan-3-ylmethyl acrylate and/or 3-methyloxetan-3-ylmethyl 2-methacrylate may be mentioned by way of example as monomers A3 having at least one oxetanyl group. Glycidyl acrylate and/or glycidyl methacrylate are particularly preferably used, glycidyl methacrylate being particularly preferred.

The amount of the monomers A3 in the process according to the invention is from 0.1 to 10% by weight, preferably from 0.3 to 7% by weight and particularly preferably from 0.5 to 5% by weight, based in each case on the total amount of monomers.

In principle, all ethylenically unsaturated compounds which differ from the monomers A1 to A3 but can be subjected to free radical copolymerization with them in a simple manner are suitable as monomers A4, such as, for example, vinylaromatic monomers, such as styrene, α-methylstyrene, o-chlorostyrene or vinyltoluenes, vinyl halides, such as vinyl chloride or vinylidene chloride, esters of vinyl alcohol and monocarboxylic acids having 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids having preferably 3 to 6 carbon atoms, such as, in particular, acrylic acid, methacrylic acid, maleic acid, fumaric acid, itaconic acid, with alkanols having in general 1 to 12, preferably 1 to 8 and in particular 1 to 4 carbon atoms, such as, in particular, methyl, ethyl, n-butyl, isobutyl, pentyl, hexyl, heptyl, octyl, nonyl, decyl and 2-ethylhexyl acrylate and methacrylate, dimethyl or di-n-butyl fumarate and maleate, nitriles of α,β-monoethylenically unsaturated carboxylic acids, such as acrylonitrile, methacrylonitrile, fumaronitrile, maleonitrile, and conjugated $C_{4-8}$-dienes, such as 1,3-butadiene (butadiene) and isoprene. Said monomers form as a rule the main monomers which, based on the total amount of monomers A4, together account for a proportion of ≥80% by weight, preferably ≥85% by weight and particularly preferably ≥90% by weight or even form the total amount of the monomers A4. As a rule, these monomers have only a moderate to low solubility in water under standard conditions [20° C., 1 atm (absolute)].

Monomers A4 which have a high water solubility under the abovementioned conditions are those which comprise either at least one sulfo group and/or the corresponding anion thereof or at least one amino, ureido or N-heterocyclic group and/or the ammonium derivatives thereof which are protonated or alkylated on the nitrogen. Vinylsulfonic acid, 2-acrylamido-2-methylpropane-sulfonic acid, styrenesulfonic acid and the water-soluble salts thereof and N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl)methacrylamide and 2-(1-imidazolin-2-onyl)ethyl methacrylate may be mentioned by way of example. Usually, the abovementioned water-soluble monomers A4 are used only as modifying monomers in amounts of ≤10% by weight, preferably ≤5% by weight and particularly preferably ≤3% by weight, based in each case on the total amount of monomers A4. Particularly preferably, however, no such water-soluble monomers A4 at all are used in the preparation of the polymer A.

Monomers A4, which usually increase the internal strength of the films of a polymer matrix, usually have at least two nonconjugated ethylenically unsaturated double bonds. Examples of these are monomers having two vinyl radicals, monomers having two vinylidene radicals and monomers having two alkenyl radicals. The diesters of dihydric alcohols with α,β-monoethylenically unsaturated monocarboxylic acids are particularly advantageous, among which the acrylates and methacrylates are preferred. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinyl-benzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. The abovementioned crosslinking monomers A4 are frequently used in amounts of ≤10% by weight, preferably in amounts of ≤3% by weight, based in each case on the total amount of monomers A4. Particularly preferably however, no such crosslinking monomers A4 at all are used.

Advantageously used monomers A4 for the preparation of the polymer A are those monomers or monomeric mixtures which comprise
  from 50 to 100% by weight of esters of acrylic and/or methacrylic acid with alkanols having 1 to 12 carbon atoms, or
  from 50 to 100% by weight of styrene and/or butadiene, or
  from 50 to 100% by weight of vinyl chloride and/or vinylidene chloride, or
  from 50 to 100% by weight of vinyl acetate and/or vinyl propionate.

Styrene, n-butyl acrylate, methyl methacrylate, tert-butyl acrylate, methyl acrylate, ethyl acrylate, ethyl methacrylate, 2-propylheptyl acrylate and/or 2-ethylhexyl acrylate are preferred as monomers A4.

Very advantageously, methacrylamide is used as monomer A1, acrylic acid and/or methacrylic acid as monomer A2, glycidyl acrylate and/or glycidyl methacrylate as monomer A3 and styrene, n-butyl acrylate, methyl methacrylate and/or 2-ethylhexyl acrylate as monomer A4 in the process according to the invention.

Advantageously
from 0.5 to 3% by weight of at least one monomer A1
from 0.5 to 10% by weight of at least one monomer A2 and
from 0.3 to 7% by weight of at least one monomer A3 and
from 80 to 98.7% by weight of at least one monomer A4
and particularly advantageously
from 0.7 to 2.5% by weight of at least one monomer A1
from 1 to 7% by weight of at least one monomer A2 and
from 0.5 to 5% by weight of at least one monomer A3 and
from 85.5 to 97.8% by weight of at least one monomer A4
are used in the process according to the invention.

According to the invention, the total amount of the monomers A1 to A4 can be initially taken in the aqueous reaction medium before initiation of the polymerization reaction. However, it is also possible optionally initially to take only a portion of the monomers A1 to A4 in the aqueous reaction medium before initiation of the polymerization reaction and then, after initiation of the polymerization under polymerization conditions, during the free radical emulsion polymerization according to the invention, to add the total amount or any remaining amount continuously at the rate of consumption at constant or changing flow rates or batchwise. The metering of the monomers A1 to A4 can be effected as separate individual streams, as inhomogeneous or homogeneous (partial) mixtures or as a monomer emulsion. Advantageously, the monomers A1 to A4 are metered in the form of a monomer mixture, in particular in the form of an aqueous monomer emulsion.

According to the invention, dispersants which both keep the monomer droplets as well as the resulting polymer particles dispersed in aqueous medium and thus ensure the stability of the aqueous polymer dispersion produced are concomitantly used in the present process. Suitable dispersants are both the protective colloids usually used for carrying out free radical aqueous emulsion polymerizations and emulsifiers.

Suitable protective colloids are, for example, polyvinyl alcohols, polyalkylene glycols, alkali metal salts of polyacrylic acids and polymethacrylic acids, gelatin derivatives or copolymers comprising acrylic acid, methacrylic acid, maleic anhydride, 2-acrylamido-2-methylpropanesulfonic acid and/or 4-styrenesulfonic acid and the alkali metal salts thereof, but also homo- and copolymers comprising N-vinylpyrrolidone, N-vinylcaprolactam, N-vinylcarbazole, 1-vinyl-imidazole, 2-vinylimidazole, 2-vinylpyridine, 4-vinylpyridine, acrylamide, methacrylamide, amino group-carrying acrylates, methacrylates, acrylamides and/or methacrylamides. A detailed description of further suitable protective colloids is to be found in Houben-Weyl, Methoden der organischen Chemie, volume XIV/1, Makromolekulare Stoffe, Georg-Thieme-Verlag, Stuttgart, 1961, pages 411 to 420.

Of course, mixtures of protective colloids and/or emulsifiers may also be used. Frequently, exclusively emulsifiers with relative molecular weights, in contrast to the protective colloids, are usually below 1000 are used as dispersants. They may be anionic, cationic or nonionic. Of course, in the case of the use of mixtures of surface-active substances, the individual components must be compatible with one another, which can be checked by means of a few preliminary experiments in case of doubt. In general, anionic emulsifiers are compatible with one another and with nonionic emulsifiers. The same also applies to cationic emulsifiers, whereas anionic and cationic emulsifiers are generally not compatible with one another. An overview of suitable emulsifiers is to be found in Houben-Weyl, Methoden der organischen Chemie, volume XIV/1, Makromolekulare Stoffe, Georg-Thieme-Verlag, Stuttgart, 1961, pages 192 to 208.

According to the invention, however, in particular emulsifiers are used as dispersants.

Common nonionic emulsifiers are, for example, ethoxylated mono-, di- and trialkylphenols (degree of ethoxylation: 3 to 50, alkyl radical: $C_4$ to $C_{12}$) and ethoxylated fatty alcohols (degree of ethoxylation: 3 to 80; alkyl radical: $C_8$ to $C_{36}$). Examples of these are the Lutensol® A brands ($C_{12}C_{14}$-fatty alcohol ethoxylates, degree of ethoxylation: 3 to 8), Lutensol® AO brands ($C_{13}C_{15}$-oxo alcohol ethoxylates, degree of ethoxylation: 3 to 30), Lutensol® AT brands ($C_{16}C_{18}$-fatty alcohol ethoxylates, degree of ethoxylation: 11 to 80), Lutensol® ON brands ($C_{10}$-oxo alcohol ethoxylates, degree of ethoxylation: 3 to 11) and the Lutensol® TO brands ($C_{13}$-oxo alcohol ethoxylates, degree of ethoxylation: 3 to 20) from BASF SE.

Customary anionic emulsifiers are, for example, alkali metal and ammonium salts of alkylsulfates (alkyl radical: $C_8$ to $C_{12}$), of sulfuric acid monoesters of ethoxylated alkanols (degree of ethoxylation: 4 to 30, alkyl radical: $C_{12}$ to $C_{18}$) and of ethoxylated alkylphenols (degree of ethoxylation: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$).

Furthermore, compounds of the general formula (I)

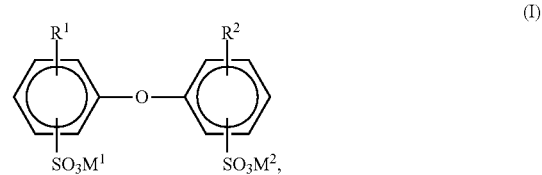

in which $R^1$ and $R^2$ are H atoms or $C_4$- to $C_{24}$-alkyl and are not simultaneously H atoms, and $M^1$ and $M^2$ may be alkali metal ions and/or ammonium ions, have proven suitable as further anionic emulsifiers. In the general formula (I), $R^1$ and $R^2$ are preferably linear or branched alkyl radicals having 6 to 18 carbon atoms, in particular having 6, 12 and 16 carbon atoms, or hydrogen, $R^1$ and $R^2$ not both simultaneously being H atoms. $M^1$ and $M^2$ are preferably sodium, potassium or ammonium, sodium being particularly preferred. Particularly advantageous compounds (I) are those in which $M^1$ and $M^2$ are sodium, $R^1$ is a branched alkyl radical having 12 carbon atoms and $R^2$ is an H atom or $R^1$. Industrial mixtures which have a proportion of from 50 to 90% by weight of the monoalkylated product, such as, for example, Dowfax® 2A1 (brand of Dow Chemical Company), are frequently used. The compounds (I) are generally known, for example from U.S. Pat. No. 4,269,749, and are commercially available.

Suitable cationic emulsifiers are as a rule primary, secondary, tertiary or quaternary ammonium salts having a $C_6$-$C_{18}$-alkyl, $C_6$-$C_{18}$-alkylaryl or heterocyclic radical, alkanolammonium salts, pyridinium salts, imidazolinium salts, oxazolinium salts, morpholinium salts, thiazolinium salts and salts of amine oxides, quinolinium salts, isoquinolinium salts, tropylium salts, sulfonium salts and phosphonium salts. Dodecylammonium acetate or the corresponding sulfate, the sulfates or acetates of various 2-(N,N,N-trimethylammonium)ethyl-paraffinic acid esters, N-cetylpyridinium sulfate, N-laurylpyridinium sulfate and N-cetyl-N,N,N-trimethylammonium sulfate, N-dodecyl-N,N,N-trimethyl-ammonium sulfate, N-octyl-N,N,N-trimethlyammonium sulfate, N,N-distearyl-N,N-dimethylammonium sulfate and the Gemini surfactant N,N'-(lauryl-dimethyl)ethylenediamine disulfate, ethoxylated tallow fatty alkyl-N-methyl-ammonium sulfate and ethoxylated oleylamine (for example Uniperol® AC from BASF SE, about 11 ethylene oxide units) are mentioned by way of example. Numerous further examples are to be found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is advantageous if the anionic opposite groups as far as possible have low nucleophilicity, such as, for example, perchlorate, sulfate, phosphate, nitrate and carboxylates, such as, for example, acetate, trifluoroacetate, trichloroacetate, propionate, oxalate, citrate, benzoate, and conjugated anions of organosulfonic acids, such as, for example, methylsulfonate, trifluoromethylsulfonate and para-toluenesulfonate, and furthermore, tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate.

The emulsifiers preferably used as dispersants are advantageously used in a total amount of $\geq 0.005$ and $\leq 10\%$ by weight, preferably $\geq 0.01$ and $\geq 5\%$ by weight, in particular $\geq 0.1$ and $\leq 3\%$ by weight, based in each case on the total amount of monomers.

The total amount of protective colloids used as dispersants in addition to or instead of the emulsifiers is often $\geq 0.1$ and $\leq 10\%$ by weight and frequently $\geq 0.2$ and $\leq 7\%$ by weight, based in each case on the total monomers.

However, anionic and/or nonionic emulsifiers and particularly preferably anionic emulsifiers are preferably used as dispersants.

According to the invention, the total amount of the dispersant can be initially taken in the aqueous reaction medium before initiation of the polymerization reaction. However, it is also possible optionally initially to take only a portion of the dispersant in the aqueous reaction medium before initiation of the polymerization reaction and then, under polymerization conditions, during the free radical emulsion polymerization according to the invention, to add the total amount or any remaining amount of the dispersant continuously or batchwise. Preferably, the addition of the main amount or the total amount of dispersant is effected in the form of an aqueous monomer emulsion.

The free radical aqueous emulsion polymerization is initiated by means of a free radical polymerization initiator (free radical initiator). Said free radical initiator may, in principle, be both peroxides and azo compounds. Of course, redox initiator systems are also suitable. In principle, inorganic peroxides, such as hydrogen peroxide or peroxodisulfates, such as the mono- or di-alkali metal or ammonium salts of peroxodisulfuric acid, such as, for example, the mono- or disodium, mono- or dipotassium or ammonium salts, or organic peroxides, such as alkyl hydroperoxides, for example tert-butyl, p-menthyl or cumyl hydroperoxide, and dialkyl or diaryl peroxides, such as di-tert-butyl or dicumyl peroxide, can be used as peroxides. Substantially 2,2'-azobis(isobutyronitrile), 2,2'-azobis(2,4-dimethylvaleronitrile) and 2,2'-azobis(amidinopropyl)dihydrochloride (AIBA, corresponds to V-50 from Wako Chemicals) are used as the azo compound. Substantially the abovementioned peroxides are suitable as oxidizing agents for redox initiator systems. Sulfur compounds having a low oxidation state, such as alkali metal sulfites, for example potassium and/or sodium sulfite, alkali metal hydrogen sulfites, for example potassium and/or sodium hydrogen sulfite, alkali metabisulfites, for example potassium and/or sodium metabisulfite, formaldehyde sulfoxylates, for example potassium and/or sodium formaldehyde sulfoxylate, alkali metal salts, especially potassium and/or sodium salts, of aliphatic sulfinic acids and alkali metal hydrogen sulfides, such as, for example potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone, can be used as corresponding reducing agents. As a rule, the amount of the free radical initiator used, based on the total amount of monomers, is from 0.01 to 5% by weight, preferably from 0.1 to 3% by weight and particularly preferably from 0.2 to 1.5% by weight.

According to the invention, the total amount of the free radical initiator can be initially taken in the aqueous reaction medium before initiation of the polymerization reaction. However, it is also possible optionally initially to take only a portion of the free radical initiator in the aqueous reaction medium before initiation of the polymerization reaction and then, under polymerization conditions, during the free radical emulsion polymerization according to the invention, to add the total amount or any remaining amount at the rate of consumption, continuously or batchwise.

Initiation of the polymerization reaction is understood as meaning the start of the polymerization reaction of the monomers present in the polymerization vessel, after the free radical initiator has formed free radicals. The initiation of the polymerization reaction can be effected by addition of free radical initiator to the aqueous polymerization mixture in the polymerization vessel under polymerization conditions. However, it is also possible to add a portion or the total amount of the free radical initiator to the initially taken aqueous polymerization mixture comprising monomers in the polymerization vessel under conditions which are not suitable for initiating a polymerization reaction, for example at low temperature, and then to establish polymerization conditions in the aqueous polymerization mixture. Polymerization conditions are to be understood as meaning generally those temperatures and pressures at which the free radical aqueous emulsion polymerization takes place at a sufficient polymerization rate. They are dependent in particular on the free radical initiator used. Advantageously, type and amount of the free radical initiator, the polymerization temperature and the polymerization pressure are chosen so that the free radical initiator has a half-life of <3 hours, particularly advantageously <1 hour and very particularly advantageously <30 minutes and sufficient initiating radicals are always available for initiating and maintaining the polymerization reaction.

The entire range from 0 to 170° C. is suitable as a reaction temperature for the free radical aqueous emulsion polymerization according to the invention. As a rule, temperatures of from 50 to 120° C., frequently from 60 to 110° C. and often from 70 to 100° C. are used. The free radical aqueous emulsion polymerization according to the invention can be carried out at a pressure less than, equal to or greater than 1 atm [1.013 bar (absolute), atmospheric pressure], so that the polymerization temperature may exceed 100° C. and may be up to 170° C. In the presence of gaseous monomers A or monomers A having a low boiling point, polymerization is preferably effected under superatmospheric pressure in the process according to the invention. The pressure may be 1.2, 1.5, 2, 5, 10 or 15 bar (absolute) or may assume even higher values. If emulsion polymerizations are carried out at reduced pressure, pressures of 950 mbar, frequently of 900 mbar and often of 850 mbar (absolute) are established. Advantageously, the free radical aqueous emulsion polymerization according to the invention is carried out at 1 atm or at superatmospheric pressure up to 20 bar with exclusion of oxygen, in particular under an inert gas atmosphere, such as, for example, nitrogen or argon.

The aqueous reaction medium can in principle also comprise water-soluble organic solvents, such as, for example, methanol, ethanol, isopropanol, butanols, pentanols, but also acetone, etc. in minor amounts (<5% by weight). However, the process according to the invention is preferably carried out in the absence of such solvents.

In addition to the abovementioned components, free radical chain transfer compounds may optionally also be used in the process according to the invention in order to reduce or control the molecular weight of the polymers obtainable by the polymerization. Substantially aliphatic and/or araliphatic halogen compounds, such as, for example, n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as, for example, ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexane-thiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as, for example, 2-hydroxyethanethiol, aromatic thiols, such as benzenethiol, ortho-, meta- or para-methylbenzenethiol, and all further sulfur compounds described in Polymerhandbook 3rd edition, 1989, J. Brandrup and E. H. Immergut, John Wiley & Sons, section II, pages 133 to 141, but also aliphatic and/or aromatic aldehydes, such as acetaldeyhde, propionaldehyde and/or benzaldehyde, unsaturated fatty acids, such as oleic acid, dienes having nonconjugated double bonds, such as divinylmethane or vinylcyclohexane or hydrocarbons having easily extractable hydrogen atoms, such as, for example, toluene, are used. However, it is also possible to use mixtures of abovementioned free radical chain-transfer compounds which do not interfere.

The total amount of free radical chain-transfer compounds optionally used in the process according to the invention, based on the total amount of monomers, is as a rule ≤5% by weight, often ≤3% by weight and frequently ≤1% by weight.

It is advantageous if a portion or the total amount of the optionally used free radical chain-transfer compound is added to the reaction medium before the initiation of the free radical polymerization. In addition, a portion or the total amount of the free radical chain-transfer compound can be added to the aqueous reaction medium, advantageously also together with the monomers A1 to A4 during the polymerization.

The polymers A obtainable by the process according to the invention can in principle have glass transition temperatures Tg in the range of ≥−70 and ≤150° C. Advantageously, the monomers A1 to A4 are chosen so that the polymers A obtained have a glass transition temperature Tg in the range of ≥−10 and ≤130° C. and particularly advantageously in the range of ≥10 and ≤100° C. Glass transition temperature Tg is understood in the context of this document as meaning the midpoint temperature according to ASTM D 3418-82, determined by differential thermal analysis (DSC) [cf. also Ullmann's Encyclopedia of Industrial Chemistry, page 169, Verlag Chemie, Weinheim, 1992 and Zosel in Farbe and Lack, 82, pages 125 to 134, 1976].

According to Fox (T. G. Fox, Bull. Am. Phys. Soc. 1956 [Ser. II] 1, page 123, and according to Ullmann's Encyclopädie der technischen Chemie, vol. 19, page 18, 4th edition, Verlag Chemie, Weinheim, 1980), the following is a good approximation of the glass transition temperature of at most weakly crosslinked copolymers:

$$1/Tg = x1/Tg1 + x2/Tg2 + \ldots xn/Tgn,$$

in which $x1, x2, \ldots xn$ are the mass fractions of the monomers $1, 2, \ldots n$ and $Tg1, Tg2, \ldots Tgn$ are the glass transition temperatures of the polymers composed in each case only of one of the monomers $1, 2, \ldots n$, in degrees Kelvin. The glass transition temperatures of these homopolymers of most ethylenically unsaturated monomers are known (or can be determined experimentally in a simple manner known per se) and are mentioned, for example, in J. Brandrup, E. H. Immergut, Polymer Handbook 1st Ed., J. Wiley, New York, 1966, 2nd Ed., J. Wiley, New York, 1975 and 3rd Ed., J. Wiley, New York, 1989, and in Ullmann's Encyclopedia of Industrial Chemistry, page 169, Verlag Chemie, Weinheim, 1992.

The free radical aqueous emulsion polymerization according to the invention can also advantageously be effected in the presence of a polymer seed, for example in the presence of from 0.01 to 3% by weight, frequently from 0.02 to 2% by weight and often from 0.04 to 1.5% by weight, of a polymer seed, based in each case on the total amount of monomers.

A polymer seed is used particularly when the particle size of the polymer particles to be prepared by means of a free radical aqueous emulsion polymerization is to be established in a targeted manner (cf. in this context, for example, U.S. Pat. No. 2,520,959 and U.S. Pat. No. 3,397,165).

In particular, a polymer seed whose polymer seed particles have a narrow particle size distribution and weight average diameter Dw of ≤100 nm, frequently ≥5 nm to ≤50 nm and often ≥15 nm to ≤35 nm is used. The determination of the weight average particle diameter is known to those skilled in the art and is effected, for example, by the analytical ultracentrifuge method. In this document, weight average particle diameter is understood as meaning the weight average Dw50 value determined by the analytical ultracentrifuge method (cf. in this context. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Machtle, pages 147 to 175).

In the context of this document, narrow particle size distribution is to be understood as meaning when the ratio of the weight average particle diameter determined by the analytical ultracentrifuge method Dw50 and the number average particle diameter DN50 [Dw50/DN50] is <2.0, preferably <1.5 and particularly preferably <1.2 or <1.1.

Usually, the polymer seed is used in the form of an aqueous polymer seed dispersion. The abovementioned quantity data are based on the polymer solids content of the aqueous polymer seed dispersion.

If a polymer seed is used, a foreign polymer seed is advantageously used. In contrast to a so-called in situ polymer seed, which is prepared before the beginning of the actual emulsion polymerization in the reaction vessel and which as a rule has the same monomer composition as the polymer prepared by the subsequent free radical aqueous emulsion polymerization, a foreign polymer seed is understood as meaning a polymer seed which was prepared in a separate reaction step and whose monomer composition is different from the polymer prepared by the free radical aqueous emulsion polymerization, which however means nothing other than that different monomers or monomer mixtures having different compositions are used for the preparation of the foreign polymer seed and for the preparation of the aqueous polymer dispersion. The preparation of a foreign polymer seed is familiar to the person skilled in the art and is usually effected in a manner such that a relatively small amount of monomers and a relatively large amount of emulsifiers are initially taken in a reaction vessel and a sufficient amount of polymerization initiator is added at the reaction temperature.

A foreign polymer seed having a glass transition temperature of ≥50° C., frequently ≥60° C. or ≥70° C. and often ≥80° C. or ≥90° C. is preferably used according to the invention. A polystyrene or a polymethyl methacrylate polymer seed is particularly preferred.

The total amount of foreign polymer seed can be initially taken in the polymerization vessel. However, it is also possible initially to take only a portion of the foreign polymer seed in the polymerization vessel and to add the remaining amount during the polymerization together with the monomers A1 to A4. If required, however, the total amount of polymer seed can also be added in the course of the polymerization. Preferably, the total amount of foreign polymer seed is initially taken before initiation of the polymerization reaction in the polymerization vessel.

The aqueous polymer A dispersions obtainable according to the invention usually have a polymer solids content of ≥10 and ≤70% by weight, frequently ≥20 and ≤65% by weight and often ≥25 and ≤60% by weight, based in each case on the aqueous polymer dispersion. The number average particle diameter determined via quasielastic light scattering (ISO standard 13 321) (cumulant z-average) is as a rule from 10 to 2000 nm, frequently from 20 to 1000 nm and often from 100 to 700 nm or from 100 to 400 nm.

Frequently, in the case of the aqueous polymer A dispersions obtained, the residual contents of unconverted monomers and other low-boiling compounds are reduced by chemical and/or physical methods likewise known to the person skilled in the art [cf. for example EP-A 771328, DE-A 19624299, DE-A 19621027, DE-A 19741184, DE-A 19741187, DE-A 19805122, DE-A 19828183, DE-A 19839199, DE-A 19840586 and 19847115].

The aqueous polymer A dispersions obtainable by the process according to the invention can be used in principle for the production of adhesives, sealing compounds, plastics renders, paper coating slips, fiber webs, paints and coating materials for organic substrates, such as, for example, leather and textile materials, and for the modification of mineral binders.

The aqueous polymer A dispersions obtainable by the process according to the invention are, however, particularly advantageously suitable for use as binders for particulate and/or fibrous substrates. Said aqueous polymer A dispersions can therefore advantageously be used for the production of moldings from particulate and/or fibrous substrates.

Particulate and/or fibrous substrates are familiar to the person skilled in the art. For example, they are wood chips, wood fibers, cellulose fibers, textile fibers, plastics fibers, glass fibers, mineral fibers, or natural fibers, such as jute, flax, hemp or sisal, but also cork chips, sand and other organic or inorganic natural and/or synthetic particulate and/or fibrous compounds whose longest dimension in the case of particulate substrates is ≤10 mm, preferably ≤5 mm and in particular ≤2 mm. According to the invention, the term substrate is of course intended to include the fiber webs obtainable from fibers, such as, for example, so-called mechanically compacted or chemically prebonded fiber webs and mechanically compacted or chemically prebonded papers (in particular base papers and sized papers) and in particular also porous filter papers.

In the context of this document, base paper is to be understood as meaning a material which is sheet-like according to DIN 6730 (August 1985), substantially comprises fibers of predominantly vegetable origin and is formed by draining a fibrous suspension comprising various assistants on a wire, the fiber felt thus obtained then being compacted and dried. Assistants used are, for example, fillers, dyes, pigments, binders, optical brighteners, retention aids, wetting agents, antifoams, preservatives, slime control agents, plasticizers, antiblocking agents, antistatic agents, water repellents, etc. known to the person skilled in the art. Depending on the intended basis weight of the sheet-like material obtained, the term base paper (basis weight ≤225 g/m$^2$) or base board (basis weight >225 g/m$^2$) is also used. Also customary is the term "cardboard", which, with a basis weight of from about 150 to 600 g/m$^2$, comprises both base paper types and base board types. For reasons of simplicity, the term "base paper" comprises base paper, base board and cardboard.

Frequently, base paper surfaces are treated with sizes which substantially influence the absorbtivity and hence the writeability or printability of the base paper. The papers thus treated are referred to as "sized papers". Corresponding processes and type and amounts of the corresponding sizes are familiar to the person skilled in the art.

Frequently, the base paper or the sized paper is also finished by so-called coating or is converted into the finished form for use. Coating of paper is understood as meaning the coating of the paper on one or both sides with an aqueous coating slip substantially comprising pigments and binders. Depending on the type of coating slip, the layer thickness to be achieved or the paper type to be produced, different coating methods are used for this purpose, for example the roll-coating, knife coating, airbrush coating or cast coating methods known to the person skilled in the art, each of which is followed by a drying step. The papers thus treated are referred to as "coated papers".

The aqueous polymer A dispersion according to the invention is particularly advantageously suitable as a formaldehyde-free binder system for the abovementioned fibers or fiber webs or papers formed therefrom. Particularly advantageously, the aqueous polymer A dispersions according to the invention are used as the sole or as additional binders or binder components for the strengthening of base paper and for sized paper, in particular for filter paper.

The process for the production of a molding from a particulate and/or fibrous substrate and the abovementioned aqueous polymer A dispersion or a binder formulation comprising said dispersion is advantageously effected in a manner such that the aqueous polymer A dispersion according to the invention or a binder formulation comprising said dispersion is applied to the particulate and/or fibrous substrate or the particulate and/or fibrous substrate is impregnated with the aqueous polymer A dispersion according to the invention or with a binder formulation comprising said dispersion, the particulate and/or fibrous substrate treated with the aqueous polymer A dispersion or with a binder formulation comprising said dispersion is optionally shaped and the particulate and/or fibrous substrate thus treated is then subjected to a thermal treatment step at a temperature of ≥50° C.

Aqueous binder formulations which comprise an aqueous polymer A dispersion according to the invention may comprise further customary assistants familiar in type and amount to the person skilled in the art, such as, for example, fillers, dyes, pigments, optical brighteners, retention aids, wetting agents, antifoams, preservatives, slime control agents, plasticizers, antiblocking agents, antistatic agents, water repellents, etc.

The application (impregnation) of the aqueous polymer A dispersion or of a binder formulation comprising said dispersion to the particulate and/or fibrous substrate is effected as a rule in a manner such that the aqueous polymer A dispersion according to the invention or a binder formulation comprising said dispersion is applied uniformly to the surface of the particulate and/or fibrous substrate. The amount of aqueous polymer A dispersion or of aqueous binder formulation is chosen so that ≥1 g and ≤100 g, preferably ≥1 g and ≤50 g and particularly preferably ≥5 g and ≤30 g of polymer A (calculated as solid) are used for 100 g of particulate and/or fibrous substrate. The technique of impregnation of the particulate and/or fibrous substrates is familiar to the person skilled in the art and is effected, for example, by soaking or by spraying the particulate and/or fibrous substrates.

After the impregnation, the particulate and/or fibrous substrate is optionally brought into the desired shape, for example by introduction into a heatable press or mold. Thereafter, the shaped impregnated particulate and/or fibrous substrate is dried and cured in a manner familiar to the person skilled in the art.

Frequently, the drying and curing of the optionally shaped impregnated particulate and/or fibrous substrate is effected at a temperature of ≥50° C. and ≤250° C., preferably ≥100° C. and ≤220° C. and particularly preferably ≥150 and ≤200° C.

The moldings obtainable by the process according to the invention, in particular fiber webs or papers, have advantageous properties, in particular improved breaking strength or an increased bursting strength in comparison with the moldings of the prior art.

The invention is to be illustrated with reference to the following nonlimiting examples.

EXAMPLES a) Aqueous Polymer A Dispersions

Example 1

A mixture consisting of 560 g of deionized water and 26.3 g of an aqueous polystyrene seed latex (solids content 33% by weight; weight average particle diameter 30 nm) was initially taken at from 20 to 25° C. (room temperature) and under a nitrogen atmosphere in a 5 l polymerization vessel equipped with stirrer, thermometer, reflux condenser and metering lines.

Feed 1 consisted of a homogenous emulsion prepared from 396 g of deionized water, 46.7 g of a 3% strength by weight aqueous sodium pyrophosphate solution, 6.2 g of a 45% strength by weight aqueous solution of a $C_{12}C_{14}$-alkyldiphenyl ether disulfonic acid sodium salt (Dowfax® 2A1), 50.0 g of a 28% strength by weight aqueous solution of sodium lauryl ether sulfate (Texapon® NSO from Cognis), 68.6 g of acrylic acid, 46.7 g of a 15% strength by weight aqueous solution of methacrylamide, 23.5 g of glycidyl methacrylate, 734 g of styrene and 567 g of n-butyl acrylate.

Feed 2 consists of 110 g of a 7% strength by weight aqueous solution of sodium peroxodisulfate.

The initially taken mixture was heated to 95° C. with stirring and under a nitrogen atmosphere. Thereafter, while maintaining this temperature, 33.0 g of feed 2 were added and the initially taken mixture was stirred for 5 minutes. Thereafter, beginning at the same time, feed 1 was metered in in the course of 135 minutes and the remaining amount of feed 2 in the course of 140 minutes at constant flow rates.

After the end of the feeds, postpolymerization was effected for a further 15 minutes at 95° C. and the aqueous polymer dispersion obtained was then cooled to 75° C. At this temperature, beginning at the same time, 35.0 g of a 10% strength by weight aqueous tert-butyl hydroperoxide solution and 42.1 g of a 13.3% strength by weight aqueous solution of acetone bisulfite (molar 1:1 adduct of acetone and sodium hydrogen sulfite) were metered in in the course of 60 minutes at constant flow rates. After the end of the meterings, the aqueous polymer dispersion was cooled to room temperature. 84.0 g of deionized water and, as biocides, 84.0 g of Acticid® MV (1.5% strength by weight aqueous biocide solution from Thor GmbH) and 11.2 g of Acticid® MBS (5% strength by weight aqueous biocide solution from Thor GmbH) were also added at room temperature to the aqueous polymer dispersion obtained, and the aqueous polymer dispersion was then filtered over a 120 μm filter. The aqueous polymer dispersion obtained had a solids content of 49.8% by weight. The number average particle size was determined as 172 nm and the Tg value as 40° C.

The solids contents were determined generally by drying a defined amount of the aqueous polymer dispersion (about 0.8 g) with a constant weight with the aid of an HR73 moisture analyzer from Mettler Toledo at a temperature of 130° C.

The number average particle diameter of the latex particles was determined by dynamic light scattering (DLS) on a 0.005 to 0.01 percent strength by weight aqueous dispersion at 23° C. by means of Autosizer IIC from Malvern Instruments, England. The average diameter of the cumulant evaluation (cumulant z-average) of the measured autocorrelation function (ISO standard 13321) is stated.

The glass transition temperature was determined with the aid of a differential calorimeter from Mettler Toledo. The heating rate was 10 K/min. The evaluation was effected by means of the Star Version 9.01 software.

Example 2

The preparation of example 2 was effected completely analogously to example 1, but with the difference that, in feed 1, 393 g instead of 396 g of deionized water, 26.3 g of a 50% strength by weight aqueous solution of acrylamide instead of 46.7 g of a 15% strength by weight aqueous solution of methacrylamide and 728 g instead of 734 g of styrene were used.

The aqueous polymer dispersion obtained had a solids content of 50.2% by weight. The number average particle size was determined as 172 nm and the Tg value as 39° C.

Example 3

The preparation of example 3 was effected completely analogously to example 1, but with the difference that, in feed 1, 266 g instead of 396 g of deionized water, 175 g instead of 46.7 g of a 15% strength by weight aqueous solution of methacrylamide and 715 g instead of 734 g of styrene were used.

The aqueous polymer dispersion obtained had a solids content of 50.5% by weight. The number average particle size was determined as 179 nm and the Tg value as 39° C.

Example 4

The preparation of example 4 was effected completely analogously to example 1, but with the difference that, in feed 1, 158 g instead of 396 g of deionized water, 327 g instead of 46.7 g of a 15% strength by weight aqueous solution of methacrylamide and 692 g instead of 734 g of styrene were used.

The aqueous polymer dispersion obtained had a solids content of 49.1% by weight. The number average particle size was determined as 178 nm and the Tg value as 39° C.

Comparative Example C1

The preparation of comparative example C1 was effected completely analogously to example 1, but with the difference that, in feed 1, 436 g instead of 396 g of deionized water, 741 g instead of 734 g of styrene and no methacrylamide were used.

The aqueous polymer dispersion obtained had a solids content of 49.6% by weight. The number average particle size was determined as 175 nm and the Tg value as 40° C.

Comparative Example C2

The preparation of comparative example C2 was effected completely analogously to example 1, but with the difference that, in feed 1, 757 g instead of 734 g of styrene and no glycidyl methacrylate were used.

The aqueous polymer dispersion obtained had a solids content of 50.2% by weight. The number average particle size was determined as 184 nm and the Tg value as 41° C.

Comparative Example C3

The preparation of comparative example C3 was effected completely analogously to example 1, but with the difference that, in feed 1, 802 g instead of 734 g of styrene and no acrylic acid were used.

The aqueous polymer dispersion obtained had a solids content of 49.8% by weight. The number average particle size was determined as 168 nm and the Tg value as 42° C.

b) Testing of Performance Characteristics

For testing the performance characteristics, a commercially available base paper for the production of automotive air filters, having a basis weight of 107 g/m$^2$, was used. The paper sheets had a size of 21.0×29.7 cm [A4], the longitudinal direction corresponding to the machine running direction.

The aqueous polymer dispersions obtained according to examples 1 to 4 and comparative examples C1 to C3 were diluted to a solids content of 10% by weight with deionized water. Thereafter, the abovementioned paper sheets were passed in the longitudinal direction via a continuous travelling screen with a screen running speed of 80 cm per minute through the binder liquors 1 to 4 and C1 to C3 thus obtained. By subsequent removal of the binder liquor by suction, a wet coat of 210 g/m$^2$ (corresponding to 21 g of polymer per m$^2$) was established. Thereafter, the moist paper sheets were dried for 3 minutes at 180° C. in a Mathis oven with a maximum hot air flow. Thereafter, the impregnated papers thus obtained were stored for 24 hours at 23° C. and 50% relative humidity in a conditioned chamber.

Thereafter, 20×15 cm test strips were cut from the impregnated papers. In accordance with the aqueous polymer dispersions 1 to 4 and C1 to C3 used for the impregnation, said strips were designated as paper strips 1 to 4 and paper strips C1 to C3, respectively. The test strips were stored for 2 minutes in a 2% strength by weight aqueous solution of Emulgator® K30 (sodium alkanesulfonate having an average chain length of 15 C; from Bayer AG), excess emulsifier solution was dabbed off with a cotton fabric and immediately thereafter the bursting strength (wet) was determined using a strength tester from Zwick with the bursting strength test module according to ISO 2758. For this purpose, the respective test strips were clamped over a circular elastic membrane and the membrane together with the respective test strip was caused to bulge by means of a hydraulic fluid until the respective test strip had burst. The pressure on bursting of the test strip is referred to as bursting strength. The higher the bursting strength, the better it is rated. In each case 5 separate measurements were carried out. The bursting strength values stated in table 1 below represent the mean values of these individual measurements.

TABLE 1

Bursting strength values of the test strips obtained with the use of polymer dispersions 1 to 4 according to the invention and comparative dispersions C1 to C3

| Test strip | Bursting strength (wet) [kPa] |
|---|---|
| C1 | 160 |
| C2 | 158 |
| C3 | 152 |
| 1 | 189 |
| 2 | 197 |
| 3 | 203 |
| 4 | 179 |

The invention claimed is:

1. A process for preparing an aqueous dispersion of a polymer A, comprising:
polymerizing ethylenically unsaturated monomers in a free radical aqueous emulsion polymerization in the presence of a dispersant and a free radical initiator,
wherein the ethylenically unsaturated monomers consist of from 0.1 to 5% by weight of at least one monomer selected from the group consisting of acrylamide, and methacrylamide (monomer A1); from 0.1 to 15% by weight of at least one ethylenically unsaturated $C_3$- to $C_6$-mono- or dicarboxylic acid (monomer A2); from 0.1 to 10% by weight of at least one ethylenically unsaturated compound which has at least one oxiranyl or one oxetanyl group (monomer A3); and from 70 to 99.7% by weight of at least one other ethylenically unsaturated compound which is copolymerizable with the monomers A1 to A3 (monomer A4).

2. The process of claim 1,
wherein the ethylenically unsaturated monomers consist of from 0.7 to 2.5% by weight of the at least one monomer A1, from 1 to 7% by weight of the at least one monomer A2, from 0.5 to 5% by weight of the at least one monomer A3, and from 85.5 to 97.8% by weight of the at least one monomer A4.

3. The process of claim 1, wherein monomer A1 is methacrylamide; monomer A2 is acrylic acid, methacrylic acid, or a combination thereof; monomer A3 is glycidyl acrylate, glycidyl methacrylate, or a combination thereof; and monomer A4 is styrene, n-butyl acrylate, methyl methacrylate, 2-ethylhexyl acrylate, or a combination thereof.

4. The process of claim 1, wherein a glass transition temperature Tg of the polymer A is $\geq 10$ and $\leq 100°$ C.

5. The process of claim 1, wherein the dispersant comprises an anionic emulsifier.

6. An aqueous polymer dispersion obtained by a process comprising the process of claim 1.

7. A binder for a particulate, fibrous, or both particulate and fibrous substrate, comprising the aqueous polymer dispersion of claim 6.

8. The binder of claim 7, wherein the substrate is a fibrous substrate that is a mechanically compacted or chemically bonded paper.

9. A process for producing a molding from a particulate, fibrous, or both particulate and fibrous substrate, the process comprising:
applying the aqueous polymer dispersion of claim 6 or a binder formulation comprising the aqueous polymer dispersion to a particulate, fibrous, or both particulate and fibrous substrate, then
optionally, shaping the substrate, and then
thermally treating the substrate at a temperature of $\geq 50°$ C.

10. The process of claim 9, wherein $\geq 1$ g and $\leq 100$ g of polymer A is applied per 100 g of substrate.

11. The process of claim 9, wherein the substrate is a chemically or physically prebound paper.

12. A molding obtained by a process comprising the process of claim 9.

13. A process for producing a molding from a particulate, fibrous, or both particulate and fibrous substrate, the process comprising:
preparing an aqueous polymer dispersion by the process of claim 1, then
applying the aqueous polymer dispersion or a binder formulation comprising the aqueous polymer dispersion to a particulate, fibrous, or both particulate and fibrous substrate, then
optionally, shaping the substrate, and then
thermally treating the substrate at a temperature of $\geq 50°$ C.

14. The process of claim 1, wherein at least one monomer of the at least one ethylenically unsaturated $C_3$- to $C_6$-mono- or dicarboxylic acid (monomer A2) is an anhydride of a $C_4$- to $C_6$-dicarboxylic acid.

15. The process of claim 5, wherein the anionic emulsifier comprises a compound of formula (I):

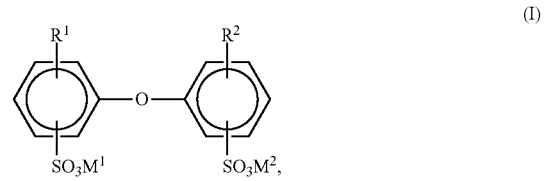

wherein $R^1$ and $R^2$ are each independently an H atom or a $C_4$- to $C_{24}$-alkyl, with the proviso that $R^1$ and $R^2$ are not simultaneously H atoms, and $M^1$ and $M^2$ are each independently an alkali metal ion or an ammonium ion.

16. The process of claim 1, wherein the dispersant comprises an emulsifier,
wherein the emulsifier is present in an amount of $\geq 0.005$ and $\leq 10\%$ by weight, based on a weight of the monomers.

17. The process of claim 1, wherein the free radical initiator is present in an amount of from 0.01 to 5% by weight, based on a weight of the monomers.

18. The process of claim 1, wherein a temperature of the polymerizing is from 50 to 120° C.

19. The process of claim 1, wherein the polymerizing is in the absence of water-soluble organic solvents.

20. The process of claim 9, wherein thermally treating the substrate is at a temperature of $\leq 250°$ C.

* * * * *